United States Patent
Nishinaga et al.

(10) Patent No.: US 7,184,762 B2
(45) Date of Patent: Feb. 27, 2007

(54) COMMUNICATION SATELLITE FACILITY AND SATELLITE COMMUNICATION SYSTEM PROVIDING BIDIRECTIONAL WIDEBAND INTERSATELLITE COMMUNICATION

(75) Inventors: Nozomu Nishinaga, Koganei (JP); Yasuo Ogawa, Koganei (JP)

(73) Assignee: Communications Research Laboratory Independent Administrative Institution, Tokyo (JP)

( * ) Notice: Subject to any disclaimer, the term of this patent is extended or adjusted under 35 U.S.C. 154(b) by 538 days.

(21) Appl. No.: 10/652,032

(22) Filed: Sep. 2, 2003

(65) Prior Publication Data

US 2005/0101247 A1    May 12, 2005

(30) Foreign Application Priority Data

Sep. 27, 2002  (JP)  .............................. 2002-284043

(51) Int. Cl.
*H04Q 7/20* (2006.01)
(52) U.S. Cl. ........................ 455/428; 455/98; 455/13.2; 455/427
(58) Field of Classification Search ................... 455/98, 455/427, 428, 429, 430, 12.1, 13.1, 13.2, 455/13.3, 9, 11.1, 17, 21, 23, 422.1; 370/316, 370/319, 466, 342
See application file for complete search history.

(56) References Cited

U.S. PATENT DOCUMENTS 5,678,175 A * 10/1997 Stuart et al. ................ 455/13.1
6,002,916 A * 12/1999 Lynch ......................... 455/13.1
6,160,993 A * 12/2000 Wilson ....................... 455/12.1
6,349,195 B1   2/2002 Saunders
6,985,454 B1 *  1/2006 Wiedeman et al. .......... 370/316

FOREIGN PATENT DOCUMENTS

JP    2001-285169    10/2001

OTHER PUBLICATIONS

Zetocha et al., "Commanding and Controlling Satellite Clusters", IEEE Intelligent Systems, Nov.-Dec. 2000.

* cited by examiner

*Primary Examiner*—Edward F. Urban
*Assistant Examiner*—John J. Lee
(74) *Attorney, Agent, or Firm*—Birch, Stewart, Kolasch and Birch, LLP

(57) ABSTRACT

A communication satellite facility and a satellite communication system adapted to respond flexibly to development and change of communication technologies occurring on the ground even after satellites have been launched. The system includes a first satellite having an antenna function, a second satellite having a modem function and a third satellite having a server function all of which are launched into one and same slot of geosynchronous orbit and connected one to another by wideband intersatellite communication. A ground station connected to a ground network communicates with the first satellite.

14 Claims, 3 Drawing Sheets

COMMUNICATION SATELLITE FACILITY AND SATELLITE COMMUNICATION SYSTEM PROVIDING BIDIRECTIONAL WIDEBAND INTERSATELLITE COMMUNICATION

This nonprovisional application claims priority under 35 U.S.C. § 119 (a) on Patent Application No. 2002-284043 filed in Japan on Sep. 27, 2002, which is herein incorporated by reference.

BACKGROUND OF THE INVENTION

The present invention relates to a satellite facility having communication function and more particularly to such satellite facility and a satellite communication system using a plurality of artificial satellites.

The satellite communication is the communication system primarily characterized by its global broadcasting function enabling a large amount of information to be simultaneously transmitted to many users. Both the cable communication and the wireless communication of ground-based station have not such function. However, development of the satellite exceptionally requires vast sums of cost as well as time and, in addition, it is difficult to equip the satellite with leading-edge technologies.

In spite of these problems, many recent commercial satellites are designed to have a lifetime in the order of 10–20 years in order to avoid an economical risk due to possible failure of launching and to reduce the cost. Even assumed that the leading-edge technologies (for example, devices, systems and protocols) can be loaded on the satellite before this satellite has been launched, it is impossible for these leading-edge technologies to follow progresses and changes of the communication technologies on the ground immediately from the launching moment. Consequently, there is an anxiety that these leading-edge technologies might become things of past.

While some experimental satellites have been launched with some efficient communication systems and achieved successful orbital travels, substantially most of the commercial satellites have conventionally been equipped only with a transponder adapted to make simple frequency conversion referred to as bent pipe relay and left mounting of regenerative transponder, base band switching equipment or the like over, although it is known that these equipments are required for efficient switching. This is for the reason that the technology or the functional lifetime often misfit the lifetime of the satellite limited by its design.

As the related art, for example, Japanese Laid-Open Patent Application Gazette No. 2001-285169 discloses a supplemental satellite communication processing system. Here is disclosed a facility basically comprises a first satellite provided with a processor and a second satellite provided also with a processor so that the second satellite is launched after the first satellite and signal processing by the processor of the first satellite is supplementally processed by the processor of the second satellite and thereby the processing capabilities of the satellite communication system are enhanced.

However, the proposal disclosed in the above-cited Gazette is nothing but a technology to complement the system with a supplemental processor in order to enhance the processing capabilities of the system and it is impossible for this technology to overcome the lifetime misfit involved by each of the satellites. In addition, this proposal is based on the premise that the first satellite is provided with main communication functions, so it is apprehended that the equipment of the first satellite might be complicated and not only the cost might increase but also the lifetime might shorten. In view of the problem as has been described above, there is a serious demand for realization of an improved satellite communication system taking account of function sharing by the respective satellite in the relationship with the lifetime of the system limited by the design and convenience for deployment.

SUMMARY OF THE INVENTION

1. The communication satellite facility according to the present invention basically comprises a first satellite primarily having antenna function and a second satellite primarily having modem function. The first satellite at least has a receiving antenna adapted to receive radio-frequency signals transmitted from a ground station, down converter means adapted to convert the radio-frequency signals received by the receiving antenna to intermediate frequency signals, a transmitting antenna adapted to transmit radio-frequency signals to the ground station, up converter means adapted to the intermediate frequency signals to be transmitted again to the radio-frequency signals, switching means adapted for switching/routing the transmitted/received said radio-frequency signals and wideband intersatellite communication means adapted for bidirectional wideband intersatellite communication between the first satellite and a second satellite.

The second satellite at least has wideband intersatellite communication means adapted for bidirectional wideband intersatellite communication between the second satellite and the first satellite and modulating/demodulating means adapted to modulate/demodulate the signals transmitted and received by the wideband intersatellite communication means.

In the communication satellite facility, the second satellite may be provided with circuit switching unit for a data link layer and a network layer.

The modulating/demodulating means of the second satellite may comprise a software modem adapted to determine and to execute at least modulating/demodulating method and/or error correcting methods in accordance with a program. It is possible thereby to change the communication method of the second satellite even after launching.

The present invention may provide the communication satellite facility comprising a third satellite having server function in addition to the first and second satellites.

In this case, the second satellite is provided with wideband intersatellite communication means adapted for bidirectional wideband intersatellite communication between the second satellite and a third satellite. The third satellite is provided with wideband intersatellite communication means adapted for bidirectional wideband intersatellite communication between the third satellite and the second satellite and digital signal processor means adapted to process and store at least a part of the signals used for the bidirectional wideband intersatellite communication.

The present invention provides also a satellite communication system comprising features as will be described below.

This system generally comprises a first satellite, a second satellite and a ground station. The first satellite at least has a receiving antenna adapted to receive radio-frequency signals transmitted from a ground station, down converter means adapted to convert the radio-frequency signals received by the receiving antenna to intermediate frequency signals, a transmitting antenna adapted to transmit radio-frequency signals to the ground station, up converter means adapted to the intermediate frequency signals to be transmitted again to the radio-frequency signals, switching means adapted for switching/routing the transmitted/received the radio-frequency signals and wideband intersatellite communication means adapted for bidirectional wideband intersatellite communication between the first satellite and a second satellite;

The second satellite at least has wideband intersatellite communication means adapted for bidirectional wideband intersatellite communication between said second satellite and said first satellite and modulating/demodulating means adapted to modulate/demodulate the signals transmitted and received by said wideband intersatellite communication means.

The ground station at least has an antenna adapted for transmission/receiving radio-frequency signals between the ground station and said first satellite, ground station signal processor means adapted to process the transmitted/received signals at least inclusive of modulation/demodulation in accordance with a given communication method and interface means to a ground network.

The first satellite and the second satellite are deployed on geosynchronous orbit and radially spaced from each other within one and same orbit slot preferably by a distance of approximately 1 km–10 km.

The second satellite may be provided with circuit switching unit for a data link layer and a network layer.

The modulating/demodulating means of the second satellite may comprise a software modem adapted to determine and to execute at least modulating/demodulating method and/or error correcting methods in accordance with a program so that the communication method of the second satellite can be changed even after launching.

The satellite communication system may comprise a third satellite having server function.

In this case, the second satellite is provided with wideband intersatellite communication means adapted for bidirectional wideband intersatellite communication between the second satellite and the third satellite. The third satellite is provided with wideband intersatellite communication means adapted for bidirectional wideband intersatellite communication between the third satellite and the second satellite and digital signal processor means adapted to process and store at least a part of the signals used for the bidirectional wideband intersatellite communication.

The satellite communication system may be further sophisticated by deploying the third satellite within a geosynchronous orbit slot common to the first satellite and the second satellite so that the respective satellites are radially spaced one from another approximately by a distance of 1 km–10 km.

The ground station signal processor means may have a software modem function to determine and to execute at least modulating and demodulating method and/or error correcting method according to a program.

Figure 1:
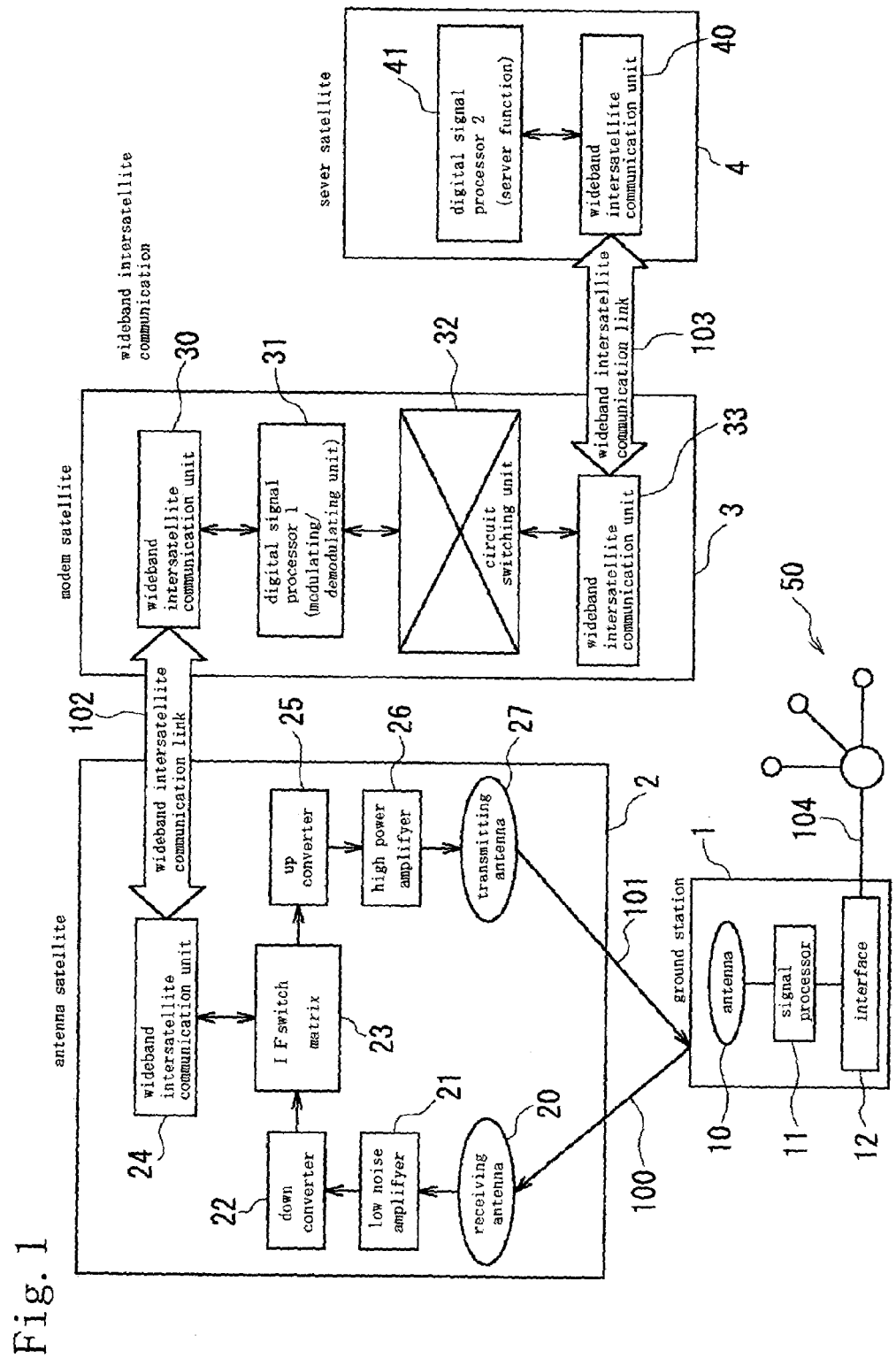
FIG. 1 is a block diagram of the satellite communication system according to the invention.

Identification of reference numerals used in the drawings is as follows:

1: ground station, 2: antenna satellite, 3: modem satellite, 4: server satellite, 10: antenna, 11: signal processor, 12: interface, 20: receiving antenna, 21: low noise amplifier, 22: down converter, 23: IF switch matrix, 24: wideband intersatellite communication link terminal, 25: up converter, 26: high-power amplifier, 27: transmitting antenna, 30: wideband intersatellite communication link terminal, 31: digital signal processor, 32: circuit switching unit, 33: wideband intersatellite communication link terminal, 40: wideband intersatellite communication link terminal, 41: digital signal processor, 50: ground network, 100: uplink, 101: downlink, 102: wideband intersatellite communication, 103: wideband intersatellite communication, 104: line connected to ground network.

DETAILED DESCRIPTION OF THE PREFERRED EMBODIMENTS

Preferred embodiments of the invention will be described more in detail with reference to the accompanying drawings.

FIG. 1 is a block diagram illustrating a satellite communication system using three artificial satellites as one embodiment of the invention. These three artificial satellites constituting the communication satellite facility according to the invention comprise an antenna satellite (2) having an antenna function to serve primarily for signal transmission to a ground station (1), a modem satellite (3) having a modem function to process such signals, and a server satellite (4) adapted to process or store information contained in the transmitted signals.

The ground station (1) may be existing ground station using the conventional technology and, any way, comprises an antenna (10), a signal processor (11) and an interface (12) connected to a ground communication network (50) via a line (104).

The antenna (10) uses a radio-frequency band to transmit (100) radio-frequency signals to a receiving antenna (20) of the antenna satellite (2) and to receive (101) radio-frequency signals transmitted from a transmitting antenna (27).

The radio-frequency signals received by the receiving antenna (20) are amplified by a low noise amplifier (21) and a down converter (22) uses locally oscillated signals to convert the radio-frequency signals to intermediate frequency (IF) signals. While the locally oscillated signals are usually generated by a local oscillation source provided in association with the down converter (22), it is also well known to transmit the locally oscillated signals generated by the local oscillation source on the ground station (1) in concurrence with the locally oscillated signals generated by the local oscillation source provided in association with the down converter (22). This is for the reason that it is necessary to synchronize the local oscillation source provided in association with the down converter (22) with the local oscillation source on the ground station (1).

The intermediate frequency signals are transmitted by an IF switch matrix (23) serving as switching means to a wideband intersatellite communication link terminal (24). The IF switch matrix (23) is of well known art adapted to switch transmission as well as receiving of signals having a plurality of channels. In this embodiment, an analog signal-handling equipment is used as the IF switch matrix.

The signals input from the wideband intersatellite communication link terminal (24) to the IF switch matrix (23) are frequency converted by an up converter (25) to the radio-frequency signals, then amplified by a high power amplifier (26) and transmitted from the transmitting antenna (27) to the ground station (1). While local oscillation signal source used by the up converter (25) may be same as the local oscillation signal source as has been described above, it is also possible to use the local oscillation signal source provided in association with the down converter (22).

It is possible to use the receiving antenna of prior art as the transmitting antenna.

In accordance with the present invention, the antenna satellite (2) comprising the receiving antenna (20), it is also possible for the low noise amplifier (21), the down converter (22), the IF switch matrix (23), the up converter (25), the high power amplifier (26) and the transmitting antenna (27) functioning as an ultra-wideband bent pipe transponder. The present invention provides also a communication technique in which the regenerative linkup is carried out in the small-sized modem satellite (3) which is exchangeable approximately every two years. The modem satellite (3) is equipped with a wideband intersatellite communication link terminal (30) serving to carry out intersatellite communication (102) between the modem satellite (3) and the antenna satellite and a digital signal processor (31) serving to modulate/demodulate the signals, and may additionally comprise a wideband intersatellite communication link terminal (33) serving to communicate with the server satellite (4).

Figure 2:
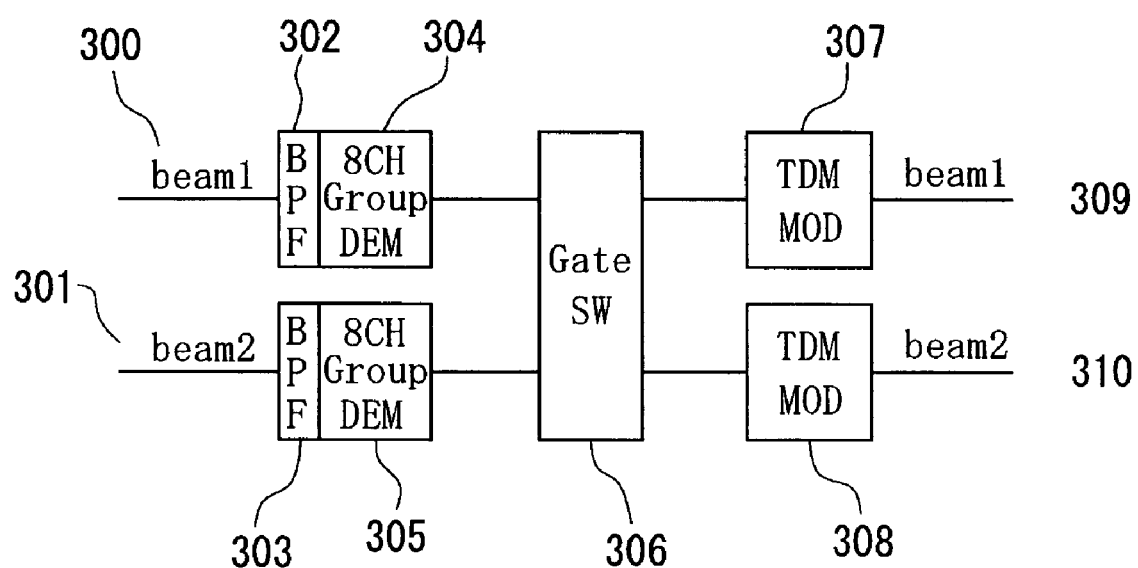
FIG. 2 is a block diagram of the digital signal processor equipped on the modem satellite according to the invention.

Function of the digital signal processor (31) will be exemplarily described in reference with FIG. 2. In this link terminal (31), a plurality of SCPC (Single Channel Per Carrier) signals (300), (301) are branched by band pass filters (302), (303) and then converted by demodulators (304), (305) to base band signals.

To branch the SCPC signals (300), (301), so-called batch branching technique can be employed, according to which the received signals may be sampled for FFT (Fast Fourier Transform) and thereby branched for every frequency channel and programmed in the digital signal processor (31). This batch branching technique contributes to weight saving of the modem satellite (3).

FIG. 2 illustrates the case in which the antenna satellite (2) receives two beam signals (300),(301) to be branched/demodulated, respectively. Each of the beams is of 8 channels. By programming the digital signal processor (31), it is possible switch a transmission rate depending on particular situations of the line. Signal modulating technique may be selected from available various techniques such as Binary Phase Shift Keying.

Coding technique may be, for example, convolutional coding technique with constraint length of 7 and coding rate of 1/2 and, in addition, error correcting function by Viterbi decoding may be provided.

These signal modulating, coding and error correcting methods are typical examples of the communication techniques supporting the communication method according to the present invention. In view of the fact that development of these techniques is extremely rapid, it is seriously desired to program the digital signal processor (31) so as to modify these techniques in response to the development thereof. The modem programmed in this manner is well known as "software modem" and the present invention provides the modem satellite (3) with such software modem so that the modem satellite (3) may be optimized with respect to the lifetime of the satellite, the development of communication techniques and the satellite's weight.

Via a switching circuit (Gate SW) (306), the demodulated signals are time division multiplex (TDM) modulated by time division multiplex modulators (307), (308) for respective beams (309), (310) to form downlink signals. These downlink signals are transmitted by the wideband satellite communication (102) back to the antenna satellite (2) and transmitted from the transmitting antenna (27) to the ground station (1).

Figure 3:
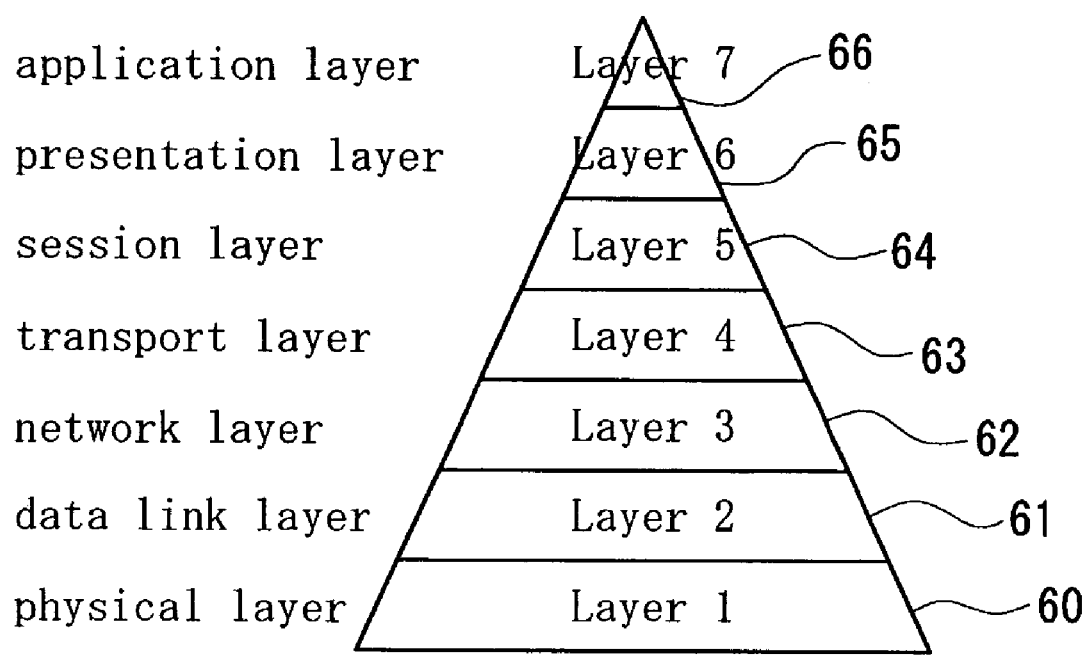
FIG. 3 is a diagram illustrating the hierarchical network model of OSI.

In accordance with the present invention, there may be provided a switching circuit (306) to ensure a circuit switching unit (32) having a sophisticated circuit switching function. Now roles of the respective satellites (2), (3) and equipment loaded thereon will be described in reference with an OSI hierarchical model illustrated by FIG. 3 and ranges of respective layers directly associated with these roles will be defined.

The OSI hierarchical model is a structural model of a network protocol defined by ISO and its bottom layer is a physical layer (Layer 1) (60) which specifies an electrical interface of physical media such as wire and optical fiber as well as a basic modulation technique.

According to the present invention, the antenna satellite (2) governs the electrical interface in the Layer 1 (60).

The modem satellite (3) carries out not only the signal processing relating to the modulation technique etc. which are at a relatively high position in the Layer 1 (60) but also the signal processing relating to the data packet making technique as well as the transmitting/receiving protocol in a data link layer (Layer 2) (61) and the signal processing relating to the data transfer protocol between a pair of optional nodes connected to each other on the network in a network layer (Layer 3) (62).

More specifically, the modem satellite (3) governs the signal processing at levels of Ethernet, ATM, IPv4, IPv6, IPX etc.

Referring to FIG. 1, the digital signal processor (31) carries out the signal processing relating to the high position in the Layer 1 (60) and the circuit switching unit (32) carries out the signal processing relating to the Layer 3 (62).

Such circuit switching unit (32) contributes to improvement of the efficiency for the circuit switching.

While the present invention can be implemented at least by the antenna satellite (2) and the modem satellite (3) having modulating/demodulating function, there may be provided, in addition to them, the circuit switching unit (32) as has been described above and the server satellite (4) adapted to govern the signal processing in further upper Layers 4–7 (63–66).

In this case, the modem satellite (3) may be further provided with the wideband intersatellite communication link terminal (33) carrying out wideband intersatellite communication (103) between the modem satellite (3) and the server satellite (4), on one hand, and the server satellite (4) may be provided with a wideband intersatellite communication link terminal (40) and a digital signal processor (41) having a server function.

The server satellite (4) carries out a series of signal processing respectively associated with a transport layer (Layer 4) (63) specifying a protocol for data transfer between processes, a session layer (Layer 5) (64) specifying a protocol for session (a sequence of procedures from start to end of communication), a presentation layer (Layer 5) (65) specifying a mode of expression for transmitted/received data and an application layer (Layer 7) (66) specifying a communication protocol at an application level.

The digital signal processor (41) loaded on the server satellite (4) comprises high capacity memory mechanisms and high speed processing mechanisms so that protocol, information and data etc. relating to the signals received by the wideband intersatellite communication (103) can be processed and/or stored. Such processing is similar to the processing carried out by the server unit of well known art deployed on the ground and it is also possible for the server satellite (4) to carry out a given processing in association with the relevant layer in the OSI hierarchical model as has been described above.

By deploying the server satellite (4) on a geosynchronous orbit in this manner, a lag time can be shortened to ½ or more of such lag time experienced in the case of the server deployed on the ground. In addition, the intersatellite communication (103) enables a communication band to be substantially doubled.

The wideband intersatellite communication link terminals (24), (30), (33), (40) may employ the intersatellite communication technology. For example, light wave and radio wave can be selectively used. In any case, the communication system according to the present invention is characterized in that the antenna satellite (2), the modem satellite (3) and the server satellite (4) are put in positions radially spaced one from another by extremely short distances (1 km–10 km) within one and same orbit slot. This feature allows power consumption as well as satellite weight to be saved.

According to one embodiment of the invention, a communication line of 10 Gbps (10 waves of 1 Gbps signal) can be realized for optical intersatellite communication with the wideband intersatellite communication link terminals (24), (30) each having a weight of 10 kg and an output approximately of 20 W.

According to the present invention, not only the digital signal processor (31) on the modem satellite (3) but also the signal processor (11) on the ground station may use the software modem. In this case, the ground station can determine the communication method in response to a particular state of the communication line by negotiating with the communication satellite facility according to the invention.

Use of these software modems allows the communication satellite facility to respond flexibly to any variation in the communication method occurring as the communication technology develops and changes. The modem satellite (3) can be fitted with a new communication method, for example, by transmitting a firmware from the ground station (1) to the digital signal processor (31) on the modem satellite (3) to make the digital signal processor (31) to respond to the new communication method and then replacing the signal processor (11) on the ground station (1) or rewriting the firmware. In this way, the communication method can be changed over to the more sophisticated communication method.

For the modem satellite (3) newly launched, the firmware of the signal processor (11) on the ground station (1) may be multicast and then rewritten to ensure not only the signal processor (31) on the modem satellite (3) but also a plurality of ground stations (1) such as mobile terminals to respond to a new communication method at once.

Now an actual deployment of the communication satellite facility will be described in brief.

The present invention is significantly distinguished from the conventional technologies in that the function of regenerative linkup is placed under control by the modem satellite (3) so that the antenna satellite (2) having a relatively long designed lifetime can effectively function over this designed lifetime.

The antenna satellite (2) has such relatively long designed lifetime because its antenna is large-sized on the assumption that the antenna satellite (2) should function, for example, over 7–10 years. While such large-sized antenna inevitably increases a launching cost, the increased launching cost can be acceptable in view of the fact that the conventional system can not respond to a drastic change (paradigm) occurring, for example, in the communication method.

The antenna satellite (2) is launched first and simultaneously or thereafter the modem satellite (3) is launched to a position radially spaced from the antenna satellite (2) by a distance of 1 km–10 km within one and same orbit slot.

The designed lifetime of the modem satellite (3) may be set, for example, to 2 years since the power consumption as well as the satellite weight can be saved as has previously been described. This means that no excessive reliability is required for the modem satellite (3) and therefore a cost of the communication satellite facility can be reduced, on one hand, and the facility can be fitted with a sophisticated communication system, on the other hand.

The designed lifetime of the server satellite (4) may be also set approximately to 2 years so that the satellite (4) can respond flexibly, for example, to a change in the application. The server satellite (4) may be launched concurrently with or after launching of the modem satellite (3).

All the satellites (2), (3), (4) are cluster-deployed on geosynchronous orbit at positions radially spaced one from another by a distance of 1 km–10 km, preferably by a distance of 3 km–7 km. Such cluster-deployment has already been used in practice by so-called cluster satellite and can be realized by the well known technologies.

The preferred embodiments of the present invention have been described. The features of the invention constituting these preferred embodiments cooperate together to offer effects as will be described below.

A plurality of satellites can be put together by dizzy chain into the communication satellite facility wherein the antenna satellite having a long lifetime and the modem satellite desired to be exchanged after a short period of time can be effectively utilized in conformity with lifetimes of the respective satellites.

In this way, the present invention can provide the communication satellite facility and the satellite communication system both adapted to respond flexibly to development as well as changes of the communication technologies on the ground even after launching.

Furthermore, deployment of the server satellite ensures more efficient satellite communication to be realized.

What is claimed is:

1. A communication satellite facility comprising a first satellite at least having a receiving antenna adapted to receive radio-frequency signals transmitted from a ground station, down converter means adapted to convert the radio-frequency signals received by said receiving antenna to intermediate frequency signals, a transmitting antenna adapted to transmit radio-frequency signals to the ground station, up converter means adapted to the intermediate frequency signals to be transmitted again to the radio-frequency signals, switching means adapted for switching/routing the transmitted/received radio-frequency signals and wideband intersatellite communication means adapted for bidirectional wideband intersatellite communication between said first satellite and a second satellite; and said second satellite at least having wideband intersatellite communication means adapted for bidirectional wideband intersatellite communication between said second satellite and said first satellite, modulating/demodulating means adapted to modulate/demodulate the signals transmitted and received by said wideband intersatellite communication means, and a circuit switching unit for a data link layer and a network layer to conduct baseband signal processing.

2. The communication satellite facility defined by claim 1, wherein the modulating/demodulating means of said second satellite comprises a software modem adapted to determine and to execute at least modulating/demodulating method and/or error correcting methods in accordance with a program.

3. The communication satellite facility defined by claim 2, wherein said second satellite is provided with wideband intersatellite communication means adapted for bidirectional wideband intersatellite communication between said second satellite and a third satellite;

and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

4. The communication satellite facility defined by claim 1, wherein said second satellite is provided with wideband intersatellite communication means adapted for bidirectional wideband intersatellite communication between said second satellite and a third satellite; and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

5. A satellite communication system comprising a first satellite at least having a receiving antenna adapted to receive radio-frequency signals transmitted from a ground station, down converter means adapted to convert the radio-frequency signals received by said receiving antenna to intermediate frequency signals, a transmitting antenna adapted to transmit radio-frequency signals to the ground station, up converter means adapted to the intermediate frequency signals to be transmitted again to the radio-frequency signals, switching means adapted for switching/routing the transmitted/received said radio-frequency signals and wideband intersatellite communication means adapted for bidirectional wideband intersatellite communication between said first satellite and a second satellite;

said second satellite at least having wideband intersatellite communication means adapted for bidirectional wideband intersatellite communication between said second satellite and said first satellite, modulating/demodulating means adapted to modulate/demodulate the signals transmitted and received by said wideband intersatellite communication means, and a circuit switching unit for a data link layer and a network layer to conduct baseband signal processing; and said ground station at least having an antenna adapted for transmitting/receiving radio-frequency signals between said ground station and said first satellite, ground station signal processor means adapted to process the transmitted/received signals at least inclusive of modulation/demodulation in accordance with a given communication method and interface means to a ground network.

6. The satellite communication system defined by claim 5, wherein said first satellite and said second satellite are deployed on geosynchronous orbit and radially spaced from each other within one and same orbit slot by a distance of approximately 1 km–10 km.

7. The satellite communication system defined by claim 6, wherein the modulating/demodulating means of said second satellite comprises a software modem adapted to determine and to execute at least modulating/demodulating method and/or error correcting methods in accordance with a program.

8. The satellite communication system defined by claim 7, wherein said second satellite is provided with wideband intersatellite communication means adapted for bidirectional wideband intersatellite communication between said second satellite and a third satellite; and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

9. The satellite communication system defined by claim 6, wherein said second satellite is provided with wideband intersatellite communication means adapted for bidirectional wideband intersatellite communication between said second satellite and a third satellite; and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

10. The satellite communication system defined by claim 5, wherein the modulating/demodulating means of said second satellite comprises a software modem adapted to determine and to execute at least modulating/demodulating method and/or error correcting methods in accordance with a program.

11. The satellite communication system defined by claim 10, wherein said second satellite is provided with wideband intersatellite communication means adapted for bidirectional wideband intersatellite communication between said second satellite and a third satellite; and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

12. The satellite communication system defined by claim 5, wherein said second satellite is provided with wideband intersatellite communication means adapted for bidirectional wideband intersatellite communication between said second satellite and a third satellite; and said third satellite is provided with wideband intersatellite communication means adapted for bidirectional wideband intersatellite communication between said third satellite and said second satellite and digital signal processor means adapted to process and store at least a part of the signals used for said bidirectional wideband intersatellite communication.

13. The satellite communication system defined by claim 12, wherein said third satellite is deployed within a geosynchronous orbit slot common to said first satellite and said second satellite so that the respective satellites are radially spaced one from another approximately by a distance of 1 km–10 km.

14. The satellite communication system defined by claim 5, wherein said ground station signal processor means has a software modem function to determine and to execute at least modulating and demodulating method and/or error correcting method according to a program.

* * * * *